United States Patent
Sharp et al.

(10) Patent No.: US 10,021,053 B2
(45) Date of Patent: Jul. 10, 2018

(54) SYSTEMS AND METHODS FOR THROTTLING DISPLAY OF ELECTRONIC MESSAGES

(71) Applicant: GOOGLE LLC, Mountain View, CA (US)

(72) Inventors: Phillip Sharp, Sunnyvale, CA (US); Xander Pollock, Palo Alto, CA (US); Matthew J. Bolohan, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 298 days.

(21) Appl. No.: 14/829,587

(22) Filed: Aug. 18, 2015

(65) Prior Publication Data
US 2015/0358269 A1 Dec. 10, 2015

Related U.S. Application Data

(63) Continuation of application No. 14/145,005, filed on Dec. 31, 2013, now Pat. No. 9,124,546.

(51) Int. Cl.
| | |
|---|---|
| G06F 3/00 | (2006.01) |
| H04L 12/58 | (2006.01) |
| G06F 3/0484 | (2013.01) |
| G06F 3/048 | (2013.01) |

(52) U.S. Cl.
CPC .............. H04L 51/12 (2013.01); H04L 51/02 (2013.01); H04L 51/046 (2013.01); H04L 51/36 (2013.01); G06F 3/048 (2013.01); G06F 3/0484 (2013.01); H04L 51/32 (2013.01)

(58) Field of Classification Search
CPC ....................................... G06F 3/0481–3/0489
See application file for complete search history.

(56) References Cited

U.S. PATENT DOCUMENTS

| 4,914,650 A | 4/1990 | Sriram |
| 5,948,040 A | 9/1999 | DeLorme et al. |
| 5,948,058 A | 9/1999 | Kudoh et al. |

(Continued)

OTHER PUBLICATIONS

Soni, "An automatic email mining approach using semantic non-parametric K—means++ clustering", May 2013, 104 pgs.

(Continued)

Primary Examiner — Steven B Theriault
(74) Attorney, Agent, or Firm — Morgan, Lewis & Bockius LLP

(57) ABSTRACT

A method throttles display of electronic messages. The process displays a list of entries in an email application. The list of entries includes a first electronic message, a first message cluster, and a second message cluster. The process detects the occurrence of a cluster display trigger event for the first message cluster. The trigger event is one of: detection of passage of a predetermined amount of time since refreshing display of the first message cluster, an occurrence of a particular time of day, an occurrence of a predetermined date, or receipt by the first message cluster of a predefined number of new electronic messages since previously refreshing the display of the list. In response to the detected trigger event, the process refreshes the display of the list of entries, including re-ranking the first message cluster within the list of entries. This changes the relative position of the first message cluster.

20 Claims, 11 Drawing Sheets

(56) References Cited

U.S. PATENT DOCUMENTS

| | | |
|---|---|---|
| 6,044,260 A | 3/2000 | Eaton et al. |
| 6,057,841 A | 5/2000 | Thurlow et al. |
| 6,147,977 A | 11/2000 | Thro et al. |
| 6,232,972 B1 | 5/2001 | Arcuri et al. |
| 6,252,597 B1 | 6/2001 | Lokuge |
| 6,333,973 B1 | 12/2001 | Smith et al. |
| 6,351,764 B1 | 2/2002 | Voticky et al. |
| 6,421,709 B1 | 7/2002 | McCormick et al. |
| 6,507,866 B1 | 1/2003 | Barchi |
| 6,700,591 B1 | 3/2004 | Sharpe |
| 6,704,772 B1 | 3/2004 | Ahmed et al. |
| 6,725,228 B1 | 4/2004 | Clark et al. |
| 6,778,642 B1 | 8/2004 | Schmidt, Jr. et al. |
| 6,961,341 B1 | 11/2005 | Krishnan |
| 7,120,865 B1 | 10/2006 | Horvitz et al. |
| 7,167,910 B2 | 1/2007 | Farnham et al. |
| 7,194,516 B2 | 3/2007 | Giacobbe et al. |
| 7,359,947 B2 | 4/2008 | Kelley et al. |
| 7,386,535 B1 | 6/2008 | Kalucha et al. |
| 7,415,504 B2 | 8/2008 | Schiavone et al. |
| 7,421,690 B2 | 9/2008 | Forstall et al. |
| 7,429,993 B2 | 9/2008 | Hui |
| 7,475,120 B1 | 1/2009 | Ngo et al. |
| 7,506,263 B1 | 3/2009 | Johnston et al. |
| 7,536,652 B2 | 5/2009 | Uemura et al. |
| 7,539,732 B2 | 5/2009 | Kelso et al. |
| 7,568,011 B2 | 7/2009 | Bocking et al. |
| 7,689,656 B2 | 3/2010 | McCarthy et al. |
| 7,707,255 B2 | 4/2010 | Satterfield et al. |
| 7,730,137 B1 | 6/2010 | Toomey |
| 7,765,212 B2 | 7/2010 | Surendran et al. |
| 7,788,329 B2 | 8/2010 | Barrett et al. |
| 7,814,155 B2 | 10/2010 | Buchheit et al. |
| 7,895,279 B2 | 2/2011 | Forstall et al. |
| 7,895,537 B2 | 2/2011 | Gruen et al. |
| 7,958,099 B2 | 6/2011 | Kang et al. |
| 7,979,501 B1 | 7/2011 | Coleman et al. |
| 7,996,900 B2 | 8/2011 | Gillum et al. |
| 8,010,613 B2 | 8/2011 | Oral et al. |
| 8,031,845 B2 | 10/2011 | Gruen et al. |
| 8,041,745 B2 | 10/2011 | Newton et al. |
| 8,065,369 B2 | 11/2011 | Turski et al. |
| 8,095,400 B2 | 1/2012 | Herde et al. |
| 8,108,469 B2 | 1/2012 | Kent, Jr. et al. |
| 8,140,703 B2 | 3/2012 | Morris et al. |
| 8,150,926 B2 | 4/2012 | Sundararajan et al. |
| 8,150,930 B2 | 4/2012 | Satterfield et al. |
| 8,176,130 B2 | 5/2012 | Daniell |
| 8,224,902 B1 | 7/2012 | Glasser et al. |
| 8,230,350 B2 | 7/2012 | Dodsworth |
| 8,233,885 B2 | 7/2012 | Kansal et al. |
| 8,239,874 B2 | 8/2012 | Anderson et al. |
| 8,281,382 B1 | 10/2012 | Sanyal et al. |
| 8,286,089 B2 | 10/2012 | Hardy et al. |
| 8,307,029 B2 | 11/2012 | Davis et al. |
| 8,375,307 B2 | 2/2013 | Kim |
| 8,375,400 B2 | 2/2013 | Sutedja et al. |
| 8,402,096 B2 | 3/2013 | Affronti et al. |
| 8,448,084 B2 | 5/2013 | Brichter |
| 8,499,042 B2 | 7/2013 | Brown et al. |
| 8,499,048 B2 | 7/2013 | Malik et al. |
| 8,533,274 B2 | 9/2013 | Buchheit et al. |
| 8,560,619 B1 | 10/2013 | Huston et al. |
| 8,572,277 B2 | 10/2013 | Morris et al. |
| 8,577,967 B1 | 11/2013 | Chavez et al. |
| 8,583,747 B2 | 11/2013 | Buchheit et al. |
| 8,626,851 B2 | 1/2014 | Buchheit et al. |
| 8,656,289 B1 | 2/2014 | Dodsworth |
| 8,701,018 B1 | 4/2014 | Keel et al. |
| 2002/0143871 A1 | 10/2002 | Meyer et al. |
| 2002/0160757 A1 | 10/2002 | Shavit et al. |
| 2003/0020749 A1 | 1/2003 | Abu-Hakima et al. |
| 2003/0154212 A1 | 8/2003 | Schirmer et al. |
| 2003/0177190 A1 | 9/2003 | Moody et al. |
| 2003/0195811 A1 | 10/2003 | Hayes, Jr. et al. |
| 2003/0214534 A1 | 11/2003 | Uemura et al. |
| 2003/0233419 A1 | 12/2003 | Beringer |
| 2004/0078190 A1 | 4/2004 | Fass et al. |
| 2004/0153456 A1 | 8/2004 | Charnock et al. |
| 2004/0199529 A1 | 10/2004 | Clark et al. |
| 2004/0254998 A1 | 12/2004 | Horvitz |
| 2005/0004990 A1 | 1/2005 | Durazo et al. |
| 2005/0018819 A1 | 1/2005 | Schmidt, Jr. et al. |
| 2005/0080851 A1 | 4/2005 | Kent, Jr. et al. |
| 2005/0080862 A1 | 4/2005 | Kent, Jr. et al. |
| 2005/0102366 A1 | 5/2005 | Kirsch |
| 2005/0114781 A1 | 5/2005 | Brownholtz et al. |
| 2005/0138552 A1 | 6/2005 | Venolia |
| 2005/0193076 A1 | 9/2005 | Flury et al. |
| 2005/0193345 A1 | 9/2005 | Klassen et al. |
| 2005/0228790 A1 | 10/2005 | Ronnewinkel et al. |
| 2005/0246658 A1 | 11/2005 | Uemura et al. |
| 2005/0256968 A1 | 11/2005 | Johnson |
| 2006/0010215 A1 | 1/2006 | Clegg et al. |
| 2006/0031340 A1 | 2/2006 | Mathew et al. |
| 2006/0031347 A1 | 2/2006 | Sahi |
| 2006/0059238 A1 | 3/2006 | Slater et al. |
| 2006/0064410 A1 | 3/2006 | Razza et al. |
| 2006/0069734 A1 | 3/2006 | Gersh et al. |
| 2006/0075044 A1 | 4/2006 | Fox et al. |
| 2006/0095466 A1 | 5/2006 | Stevens et al. |
| 2006/0123360 A1 | 6/2006 | Anwar et al. |
| 2006/0173824 A1 | 8/2006 | Bensky et al. |
| 2006/0173961 A1 | 8/2006 | Turski et al. |
| 2006/0206495 A1 | 9/2006 | Van Gageldonk et al. |
| 2006/0277504 A1* | 12/2006 | Zinn ................. G06F 3/0482 715/864 |
| 2007/0005592 A1 | 1/2007 | Kender et al. |
| 2007/0038718 A1 | 2/2007 | Khoo et al. |
| 2007/0106729 A1 | 5/2007 | Adams et al. |
| 2007/0156669 A1 | 7/2007 | Marcisio et al. |
| 2007/0203991 A1* | 8/2007 | Fisher ................. G06Q 10/107 709/206 |
| 2007/0262861 A1 | 11/2007 | Anderson et al. |
| 2007/0277113 A1 | 11/2007 | Agrawal et al. |
| 2007/0299923 A1 | 12/2007 | Skelly et al. |
| 2008/0215687 A1 | 9/2008 | Madnani |
| 2009/0037350 A1* | 2/2009 | Rudat ................. G06Q 10/107 706/11 |
| 2009/0089798 A1 | 4/2009 | Anderson et al. |
| 2010/0017492 A1* | 1/2010 | Reistad ................. G06Q 30/02 709/206 |
| 2010/0030798 A1 | 2/2010 | Kumar et al. |
| 2010/0049806 A1 | 2/2010 | Haynes et al. |
| 2010/0056221 A1 | 3/2010 | Park |
| 2010/0114855 A1 | 5/2010 | Li et al. |
| 2010/0199180 A1 | 8/2010 | Brichter |
| 2010/0262922 A1 | 10/2010 | Fan et al. |
| 2010/0278453 A1 | 11/2010 | King |
| 2010/0306249 A1 | 12/2010 | Hill et al. |
| 2011/0010182 A1 | 1/2011 | Turski et al. |
| 2011/0072363 A1 | 3/2011 | Mandel et al. |
| 2011/0231499 A1 | 9/2011 | Stovicek et al. |
| 2011/0289106 A1 | 11/2011 | Rankin et al. |
| 2011/0307804 A1 | 12/2011 | Spierer |
| 2012/0013805 A1 | 1/2012 | Mihara et al. |
| 2012/0102037 A1 | 4/2012 | Ozonat |
| 2012/0110085 A1* | 5/2012 | Malik ................. G06Q 10/00 709/205 |
| 2012/0131095 A1 | 5/2012 | Luna et al. |
| 2012/0149342 A1 | 6/2012 | Cohen et al. |
| 2012/0180021 A1 | 7/2012 | Byrd et al. |
| 2012/0185781 A1 | 7/2012 | Guzman et al. |
| 2012/0185797 A1 | 7/2012 | Thorsen et al. |
| 2012/0198053 A1 | 8/2012 | Ozhan et al. |
| 2012/0204191 A1 | 8/2012 | Shia et al. |
| 2012/0210334 A1 | 8/2012 | Sutedja et al. |
| 2012/0271908 A1 | 10/2012 | Luna et al. |
| 2012/0272160 A1 | 10/2012 | Spivack et al. |
| 2013/0024440 A1 | 1/2013 | Dimassimo et al. |
| 2013/0055099 A1 | 2/2013 | Yao et al. |
| 2013/0055105 A1 | 2/2013 | Spierer |
| 2013/0110953 A1 | 5/2013 | Sutedja et al. |
| 2013/0159879 A1 | 6/2013 | Affronti et al. |

(56) References Cited

U.S. PATENT DOCUMENTS

| | | | |
|---|---|---|---|
| 2013/0165165 A1 | 6/2013 | Macek et al. | |
| 2013/0166280 A1 | 6/2013 | Quast et al. | |
| 2013/0212189 A1 | 8/2013 | Velissarakos | |
| 2013/0297604 A1 | 11/2013 | Sutedja et al. | |
| 2013/0305187 A1 | 11/2013 | Phillips et al. | |
| 2013/0325705 A1 | 12/2013 | Laird et al. | |
| 2013/0332850 A1 | 12/2013 | Bovet et al. | |
| 2014/0046945 A1 | 2/2014 | Deolalikar et al. | |
| 2014/0047050 A1* | 2/2014 | Kim | H04L 51/00 709/206 |
| 2014/0052797 A1 | 2/2014 | Lessard et al. | |
| 2014/0096032 A1 | 4/2014 | Mayblum et al. | |
| 2014/0096033 A1 | 4/2014 | Blair | |
| 2014/0115495 A1 | 4/2014 | Wetherell et al. | |
| 2014/0279016 A1 | 9/2014 | Capel et al. | |
| 2014/0280619 A1* | 9/2014 | Banatwala | H04L 51/36 709/206 |
| 2014/0280635 A1 | 9/2014 | Bengochea et al. | |
| 2014/0310324 A1 | 10/2014 | Branton et al. | |
| 2014/0344711 A1 | 11/2014 | Hallerstrom Sjostedt et al. | |
| 2014/0359480 A1 | 12/2014 | Vellal et al. | |
| 2015/0088784 A1 | 3/2015 | Dhara et al. | |

OTHER PUBLICATIONS

Kandogan et al., "Avatar Semantic Search: A Database Approach to Information Retrieval", 2006, 3 pgs.

Cohen, Learning Rules that classify E-mail, Feb. 22, 2002, 8 pgs.

* cited by examiner

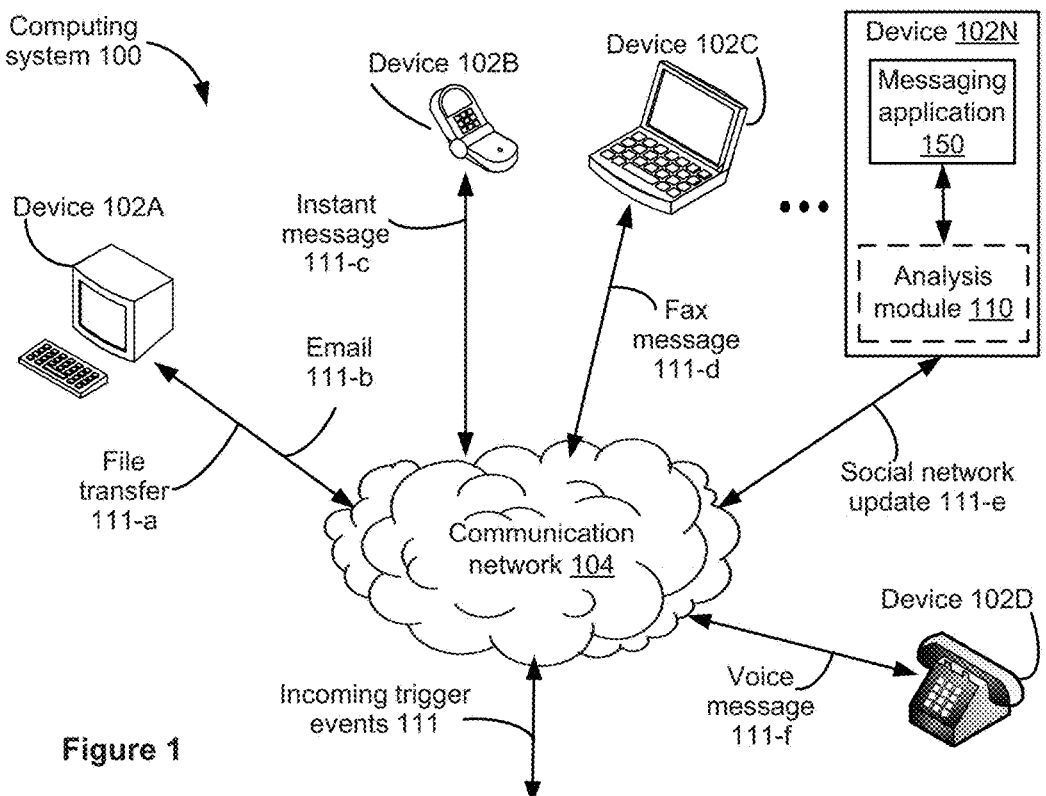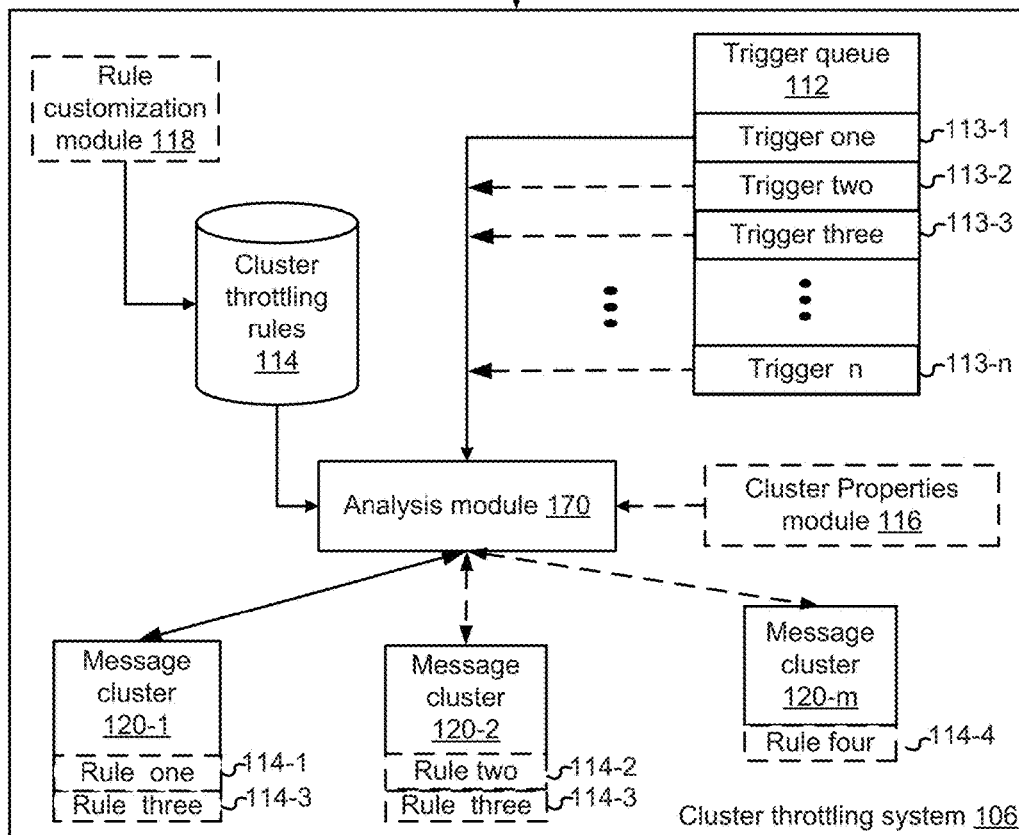
Figure 1

| | Clay Kaplan – Thought you'd be interested. Here's some p... |

302

| P | 9 New Promotions<br>View all Promotions |
|---|---|
| S | Half off all Ankle Boots<br>Shoe Heaven – All ankle boots are slashed to 50% off for... |
| T | Dinosaur Clearance Sale<br>Toypalooza – Get your dinosaur toys before they disappear! |
| H | Organic Mongolian Rutabagas<br>Half Foods – Full of vitamins! Here are five great recipes... |
| G | Try Google Checkout Today!<br>Google – Congrats! You've been selected to try Google C... |
| D | Get high for only $199<br>DenverAir – RT Flights to Denver, Colorado from SFO onl... |
| W | BOGO Gloves<br>Winter Sports Shop – Buy a right glove, get the left one fr... |
| S | One month of free shipping<br>Snack Shack – Get your chips and soda delivered to your... |
| T | Long Distance Rates as Low as 1cent/minute<br>TelecomCo – Call your mom! It's only 1 cent/minute to 20... |
| G | Grand Larceny Bicycle Pre-orders<br>Game Cove – Pre-order your copy of the video game of th... |

| M | (no subject)<br>me, Carrie – Yes! Thursday is my last day. I can't wait. I'm ... |
|---|---|
| S | 1 New Social Updates<br>Google+ |
| J | dinner plans!<br>Jamie, Sarah – Sounds good - I'm in! |

304

Yesterday

| E | Electronic Invitation: Ellen's birthday party<br>Oct 1, 3:00pm. Polish Polka Restaurant, 1112 Verd... |
|---|---|

Figure 3B

| Cluster | Cluster Type | Trigger Events | Rule # | Rule | Default |
|---|---|---|---|---|---|
| Black Friday Sales | Sales/Promotions (Luxury) | Receive new message | 1 | Refresh display after accumulation of 5 new messages | Yes |
| Black Friday Sales | Sales/Promotions (Luxury) | Detect time and date to be Thurs Nov 21, 2013 at 6:00AM | 11 | Refresh display of cluster at least once per hour until Mon Dec 2, 2013 at 11:59PM | No |
| Google+ Updates | Social Network Updates | Receive new post by friend in network | 4 | Refresh display after accumulation of 3 new messages | Yes |
| Google+ Updates | Social Network Updates | Receive private message from Andy | 15 | Refresh display of cluster immediately upon receipt of a message from Andy | No |
| Airfare Deals | Travel | Receive new message | 1 | Refresh display after accumulation of 5 new messages | Yes |
| Airfare Deals | Travel | Receive new message containing flights to "Hawaii" | 8 | Refresh display immediately upon receipt of a message containing flights to Hawaii | No |
| Fitness Tips | Newsletters | Detect time to be 6:00PM on a Friday | 10 | Refresh display every Friday at 6:00PM, if there are new messages in cluster | Yes |
| Gardening Tips | Newsletters | Receive new message | 17 | Refresh display after accumulation of 2 new messages in months Mar-Sept | No |
| Gardening Tips | Newsletters | Receive new message | 18 | Refresh display after accumulation of 10 new messages in months Oct-Feb | No |
| Grocery and Pharmacy | Sales/Promotions (Essentials) | Receive new message | 2 | Refresh display immediately upon receipt of a new message | Yes |
| Grocery and Pharmacy | Sales/Promotions (Essentials) | Receive new message | 21 | Cease to refresh display during the hours of 9:00AM – 5:00PM, Monday-Friday | No |
| All clusters | All types | Auto-away response activated | 3 | Cease to refresh display while auto-away response is activated by the user | Yes |

Figure 4

SYSTEMS AND METHODS FOR THROTTLING DISPLAY OF ELECTRONIC MESSAGES

RELATED APPLICATIONS

This application is a continuation of U.S. patent application Ser. No. 14/145,005, filed Dec. 31, 2013, entitled "Systems and Methods for Throttling Display of Electronic Messages," which is incorporated by reference herein in its entirety.

TECHNICAL FIELD

The implementations disclosed herein relate generally to throttling the display of electronic messages on a user interface.

BACKGROUND

The average user of an email application receives many electronic messages a day. For ease of reference, it may be preferred that messages containing a particular type of content (e.g., emails relating to travels, such as rental car bookings, flight tickets, and hotel reservations) are automatically organized together, even though these messages themselves do not appear related to one another. As another example, users often like to have messages relating to social network updates (e.g., Jane, a law school friend, recently joined a GOOGLE+ group for young alumni; and Tim, a co-worker, has just published a vacation photo on his GOOGLE PICASA website), grouped together and visually presented together in a listing of the user's electronic messages.

Problems exist with offering such a feature, however. One problem is that constant updating of a group of messages can cause the group of messages to constantly appear at the top of a list of messages (e.g., an email inbox). For example, displaying "Travel" emails in a group and promoting the "Travel" email group to the top of a user's inbox every time a new email is added to the group. Another problem is that a user may wish to promote particular groups of electronic messages to the top of a listing of electronic messages, based on time (e.g., the day of the week, the time of day, the month of the year), quantity of messages (e.g., after the group has 5 or more messages) or quality (e.g., importance of the group or importance of the most recent message received and assigned to the group).

The above identified technical problems are reduced or eliminated by the systems and methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 1 is an example block diagram illustrating a computing system, in accordance with some implementations.

FIGS. 3A-3D illustrate examples of message clusters and cluster display throttling, in accordance with some implementations.

FIG. 4 is an example table illustrating display throttling rules for electronic messages in a computing system, in accordance with some implementations.

SUMMARY

Figure 2A:
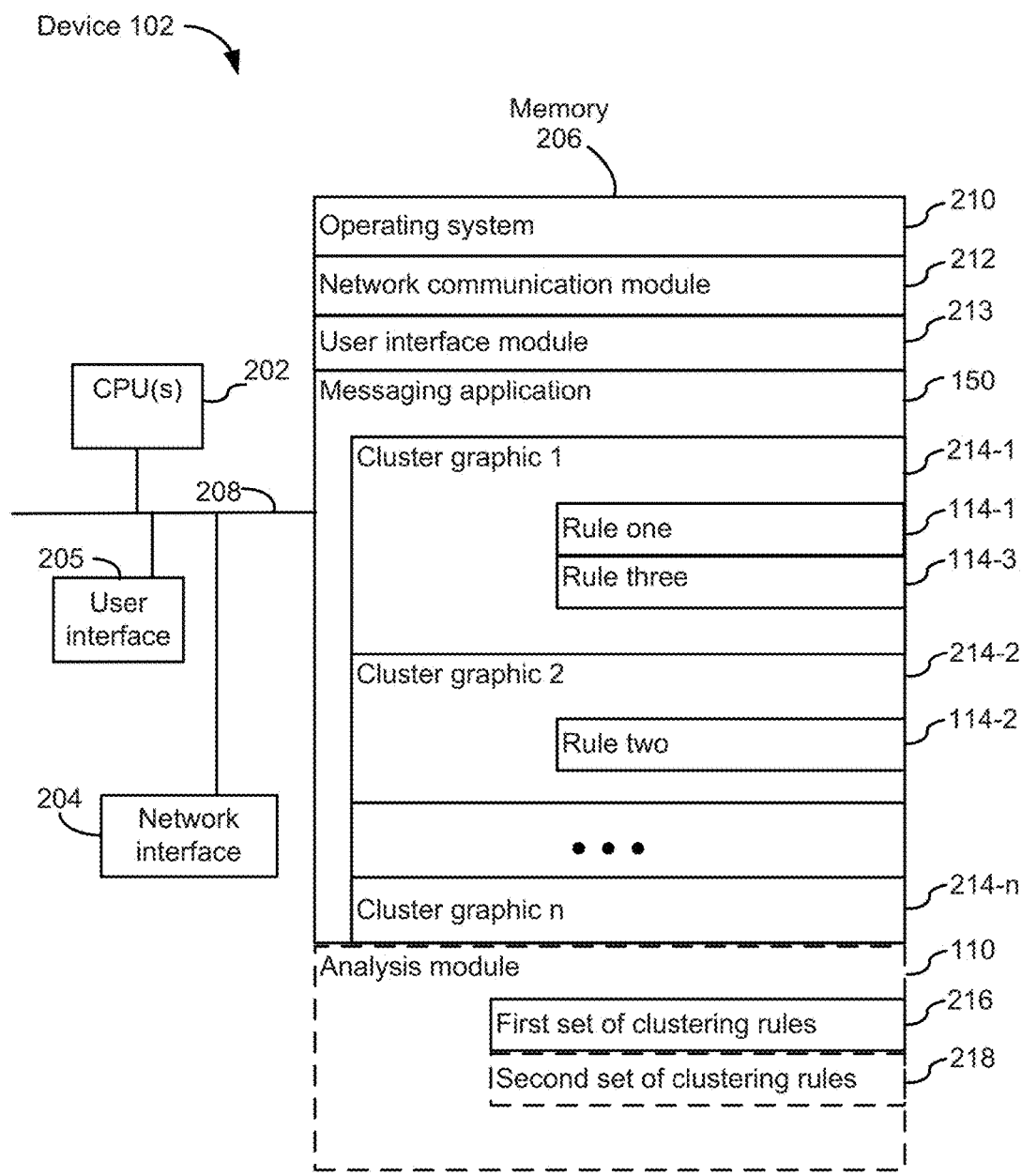
FIGS. 2A-2B are example block diagrams illustrating a computing device, and a cluster display throttling system, in accordance with some implementations.

Technical solutions (e.g., computing systems, methods, and non-transitory computer readable storage mediums) for throttling display of clustered electronic messages are provided in the present application.

In some implementations, a method for throttling display of electronic messages grouped into a message cluster includes, at a computing device, detecting occurrence of one or more cluster throttling trigger events for a first message cluster, of a first cluster type, in an email application. The method further includes, updating a set of properties for the first message cluster in accordance with the one or more cluster throttling trigger events and comparing the updated set of properties for the first message cluster to one or more cluster display throttling rules associated with the first message cluster. The method includes, in accordance with a determination that the set of properties for the first message cluster satisfies the one or more cluster display throttling rules, refreshing display of the first message cluster within a listing of electronic messages.

In some implementations, refreshing display of the first message cluster within a listing of electronic messages comprises displaying the first message cluster at the top of the listing or re-ranking the first message cluster within the listing based upon one or more re-ranking criteria. In some implementations, one of the one or more re-ranking criteria is a function of a time of occurrence of the one or more cluster throttling trigger events.

In some implementations, a cluster display throttling trigger event of the one or more cluster throttling trigger events is receipt of an incoming electronic message corresponding to the first message cluster. In some implementations, a cluster throttling trigger event of the one or more cluster throttling trigger events is the detection of passage of a predetermined amount of time since refreshing display of the first message cluster.

In some implementations, a cluster display throttling trigger event of the one or more cluster throttling trigger events is detection of the occurrence of a particular time of day and/or the occurrence of a predetermined date.

In some implementations, a cluster display throttling rule of the one or more cluster display throttling rules comprises receipt by the first message cluster of a predefined number of new electronic messages since previously refreshing display of the first message cluster. In some implementations, a cluster display throttling rule of the one or more cluster display throttling rules comprises receipt by the first message cluster of at least one new electronic message since previously refreshing display of the first message cluster, and occurrence of a particular time of day.

In some implementations, a cluster display throttling rule of the one or more cluster display throttling rules comprises the first message cluster receiving at least one new electronic message since previously refreshing display of the first message cluster and passage of a predetermined amount of time since previously refreshing display of the first message cluster.

In some implementations, a cluster display throttling rule of the one or more cluster display throttling rules comprises the first message cluster receiving at least one new electronic message since previously refreshing display of the first message cluster, where the at least one new electronic message is identified as having priority.

In some implementations, at least a subset of the one or more cluster display throttling rules is user-generated. In some implementations, one cluster display throttling rule of the one or more cluster display throttling rules is a default rule for message clusters of the first cluster type. In some implementations, one cluster display throttling rule of the one or more cluster display throttling rules is a default rule for all message clusters displayed in the listing of electronic messages. In some implementations, the default rule for all message clusters displayed in the listing of electronic messages overrides all other cluster display throttling rules.

In some implementations, satisfaction of the one or more cluster display throttling rules is based on a weighted combination of the one or more cluster display throttling rules.

In other aspects of the present disclosure, computing systems and non-transitory computer storage mediums for executing one or more steps of any of the above-described methods or any of the methods disclosed herein are also disclosed.

DETAILED DESCRIPTION

The implementations described herein provide various technical solutions to improve display of electronic messages, and in particular to the above-identified problems, by providing techniques for throttling or adjusting display of clustered electronic messages within a listing of electronic messages. Details of implementations are now described in relation to the Figures.

FIG. 1 is a block diagram illustrating a computing system 100, in accordance with some implementations.

In some implementations, the computing system 100 includes one or more devices 102 (e.g., device 102A, 102B, 102C, 102D . . . , and 102N), a communication network 104, and a cluster throttling system 106. In some implementations, a device 102 is a phone (mobile or landline, smart phone or otherwise), a tablet, a computer (mobile or otherwise), a fax machine, or an audio/video recorder.

In some implementations, a device 102 obtains an electronic message from (e.g., drafted or generated by) a user of the device 102, and transmits the electronic message to the cluster throttling system 106 for clustering with (e.g., grouping with or separating from) other electronic messages. For example, after determining that user Jack sends an email to user Mary, the device 102 transmits the email to the cluster throttling system 106, which clusters messages for Mary. In some implementations, the electronic message acts as an incoming trigger event 111 for cluster throttling system 106, that governs the display of the various message clusters 120 (e.g., moving a message cluster to the top of an email inbox).

In some implementations, a trigger event is message-based trigger event, comprising a file transfer 111-*a* (e.g., a photo, document, or video download/upload), an email 111-*b*, an instant message 111-*c* (e.g., a GOOGLE HANGOUT message), a fax message 111-*d*, a social network update 111-*e* (e.g., a GOOGLE PLUS update), or a voice message 111-*f*. In some implementations, an incoming trigger event 111 is a time-based trigger event, such as the occurrence of a particular time of day (e.g., 5 PM) or particular time of the week (e.g., 12:01 AM, Saturday morning). In some implementations, an incoming trigger event 111 is a duration of time (e.g., 1 day), and in some implementations, this duration of time is measured since the last time the message cluster was updated.

In some implementations, a device 102 includes a messaging application 150 and optionally an analysis module 110 (similar to the analysis module 170 included in the cluster throttling system 106). In some implementations, the messaging application 150 processes incoming and outgoing electronic messages into and from the device 102, such as an outgoing email sent by a user of the device 102 to another user, and a chat message by another user to a user of the device 102. In some implementations, the analysis module 110 resident on the device 102 balances processing load with the analysis module 170 resident on the cluster throttling system 106.

In some implementations, the communication network 104 interconnects one or more devices 102 with each other, and with the cluster throttling system 106. In some implementations, the communication network 104 optionally includes the Internet, one or more local area networks (LANs), one or more wide area networks (WANs), other types of networks, or a combination of such networks.

In some implementations, the cluster throttling system 106 includes an analysis module 170, a trigger queue 112, a collection of cluster throttling rules 114 (e.g., user or system-provided rules), and optionally a rule customization module 118.

As a non-limiting example, a cluster throttling system 106 analyzes incoming trigger events 111, such as receiving incoming electronic messages corresponding to one or more message clusters 120, where a message cluster is one or more electronic messages having a collective, content-based association (e.g., a "Promotions" cluster of promotional emails, or a "Social Network" cluster of social network posts) and a common message type. In some instances, incoming trigger events 111 get queued up for analysis by analysis module 170 of the cluster throttling system 106, in trigger queue 112.

In some cases, starting with Trigger One 113-1, the cluster throttling system 106 identifies one or more message clusters (e.g., message cluster 120-1) associated with Trigger One 113-1. In some instances, a single trigger event corresponds to more than one message cluster (e.g., a time-based trigger event detecting occurrence of 12:01 AM on Saturday morning). In some cases, cluster throttling system 106 and/or analysis module 170 updates a set of properties for the one or more message clusters associated with Trigger One 113-1. For example, if Trigger One 113-1 is receipt of a new message associated with message cluster 120-1, the properties for message cluster 120-1 are updated to reflect receipt of this additional message. In another example, if Trigger One 113-1 is detection of occurrence of a particular day of the week (e.g., Saturday), the properties for message cluster 120-1 (and/or other message clusters) are updated to reflect that the particular day of the week has occurred. In another example, if Trigger One 113-1 is detection of the passage of time since message cluster 120-1 had its display refreshed, the properties for message cluster 120-1 are updated to reflect this passage of time. In some cases, these message cluster properties are updated and stored in the respective message clusters (e.g., the cluster properties for message cluster 120-1 stored with message cluster 120-1). In some cases, cluster properties for some or all of the message clusters in cluster throttling system 106 are updated and stored in cluster properties module 116.

In some cases, after cluster throttling system 106 analyzes a trigger event and determines the corresponding message cluster, analysis module 170 determines which one or more cluster throttling rules apply to the respective message cluster. For example, if Trigger One 113-1 corresponds to Message Cluster 120-1, analysis module 170 determines that cluster throttling rules Rule One 114-1 and Rule Three 114-3 control display throttling of the cluster.

In some cases, cluster throttling system 106 and/or analysis module 170 analyzes the updated set of properties for the one or more identified message clusters against one or more cluster throttling rules applied to the respective message clusters (e.g., Rule One 114-1 and Rule Three 114-3 for message cluster 120-1). In some cases, the same cluster throttling rule is applied to more than one message cluster. In some cases, a message cluster of a particular type (e.g., a travel message cluster) is automatically assigned one or more cluster throttling rules by the system upon generation of the cluster. In some cases, one or more of the cluster throttling rules are user-generated, using rule customization module 118. In some cases, the one or more user-generated rules are created for only one particular message cluster, while in some cases the one or more user-generated rules can be applied to more than one message cluster. In some cases, there is one default cluster throttling rule for all message clusters, or for all message clusters of a particular type. In some cases one cluster throttling rule has superseding authority over all other cluster throttling rules in cluster throttling system 106.

In some cases, cluster throttling system 106 and/or analysis module 170 determines that the refreshed set of properties for a respective message cluster (e.g., message cluster 120-1) satisfies the one or more cluster display throttling rules associated with the respective message cluster (e.g., Rule One 114-1, Rule Three 114-3). For example, if Trigger One 113-1 is a new message corresponding to message cluster 120-1, and Rule One 114-1 is satisfied if the properties of message cluster 120-1 indicate that a new message has been received at the message cluster.

In some cases, if one or more rules associated with a respective message cluster are satisfied, cluster throttling system 106 refreshes display of the message cluster within a listing of email messages (e.g., an email inbox). Cluster throttling system 106 sends this information to communication network 104 to transmit to a device 102. These approaches are advantageous, because a user may be able to quickly and more efficiently view messages of greater importance within a listing of electronic messages.

In some implementations, the analysis module 110 is a software or hardware component resident on the device 102, such as a software package/application or a hardware chipset, for throttling display of clustered messages, and analysis module 170 on server 106 is not used. In some implementations, the analysis module 110 is not present and analysis module 170, which exists separate from or independent of the device 102 is used (e.g., a GOOGLE mail cluster throttling/processing server that is connected with but not part of the device 102, e.g., in the manner depicted in FIG. 1 with analysis module 170). In still other implementations, the analysis module 110 is a software or hardware component resident on the device 102, such as a software package/application or a hardware chipset, for throttling display of clustered messages, and analysis module 170 on server 106 is also used. That is, both analysis module 110 on device 102 and analysis module 170 on server 106 are used. For instance, in some such embodiments some clustering rules 114 (e.g. user-specified rules) are implemented on device 102 and implemented using analysis module 110 and some clustering rules 114 (e.g., system-provided rules) are implemented on server 106 and implemented using analysis module 170.

In some implementations, the trigger queue 112 stores one or more electronic messages awaiting analysis by the analysis module 170. In some implementations, the trigger queue 112 includes different types of electronic messages, such as a file transfer 111-a (e.g., a photo, document, or video upload), an email 111-b, an instant message 111-c (e.g., a Google HANGOUT message), a fax message 111-d, a social network update 111-e (e.g., a GOOGLE PLUS update), or a voice message 111-f. In some implementations, the trigger queue 112 includes various events, such as a passage of time since a respective message cluster was displayed, occurrence of a particular time of day or date, or activation of a new device 120 within computing system 100.

In some implementations, the collection of cluster throttling rules 114 include system and user-specified clustering rules. In some implementations, system-provided rules are determined by the cluster throttling system 106 (e.g., default cluster throttling rules), and user-specified rules are customized (e.g., added, removed, or modified) by a user.

In some implementations, a rule customization module 118 enables a user to customize (e.g., add, remove, and modify) cluster throttling rules within the collection of cluster throttling rules 114. These approaches enable customizing cluster throttling results to a user's specific needs.

FIG. 2A is a block diagram illustrating a computing device 102, in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the clustering system 106 and the devices 102B . . . 102N) via one or more network interfaces 204 (wired or wireless), or the communication network 104 (FIG. 1);
- a user interface module 213 for displaying user interface components or controls (e.g., textbox, button, radio button, drop-down list) to a user;
- a messaging application 150 for processing and displaying incoming and outgoing electronic messages, e.g., using cluster graphics, including:

a cluster graphic 1 (214-1) that visually displays a corresponding message cluster (e.g., message cluster 120-1, FIG. 1) according to cluster throttling rules Rule One 114-1 and Rule Three 114-3—both of which have been assigned to the message cluster corresponding to cluster graphic 1;

a cluster graphic 2 (214-2) that visually displays a corresponding message cluster (e.g., message cluster 120-2, FIG. 1) according to cluster throttling rule Rule Two 114-2—which has been assigned to the message cluster corresponding to cluster graphic 2; and a cluster graphic n (214-n) that visually displays a corresponding message cluster (e.g., message cluster 120-n, FIG. 1) according to one or more cluster throttling rules that have been assigned to message cluster n;

optionally an analysis module 110 for analyzing trigger events and cluster throttling rules, and throttling display of one or more message clusters in accordance with therewith.

In some implementations, the user interface 205 includes an input device (e.g., a keyboard, a mouse, a touchpad, a track pad, and a touch screen) for a user to interact with the device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 2B:
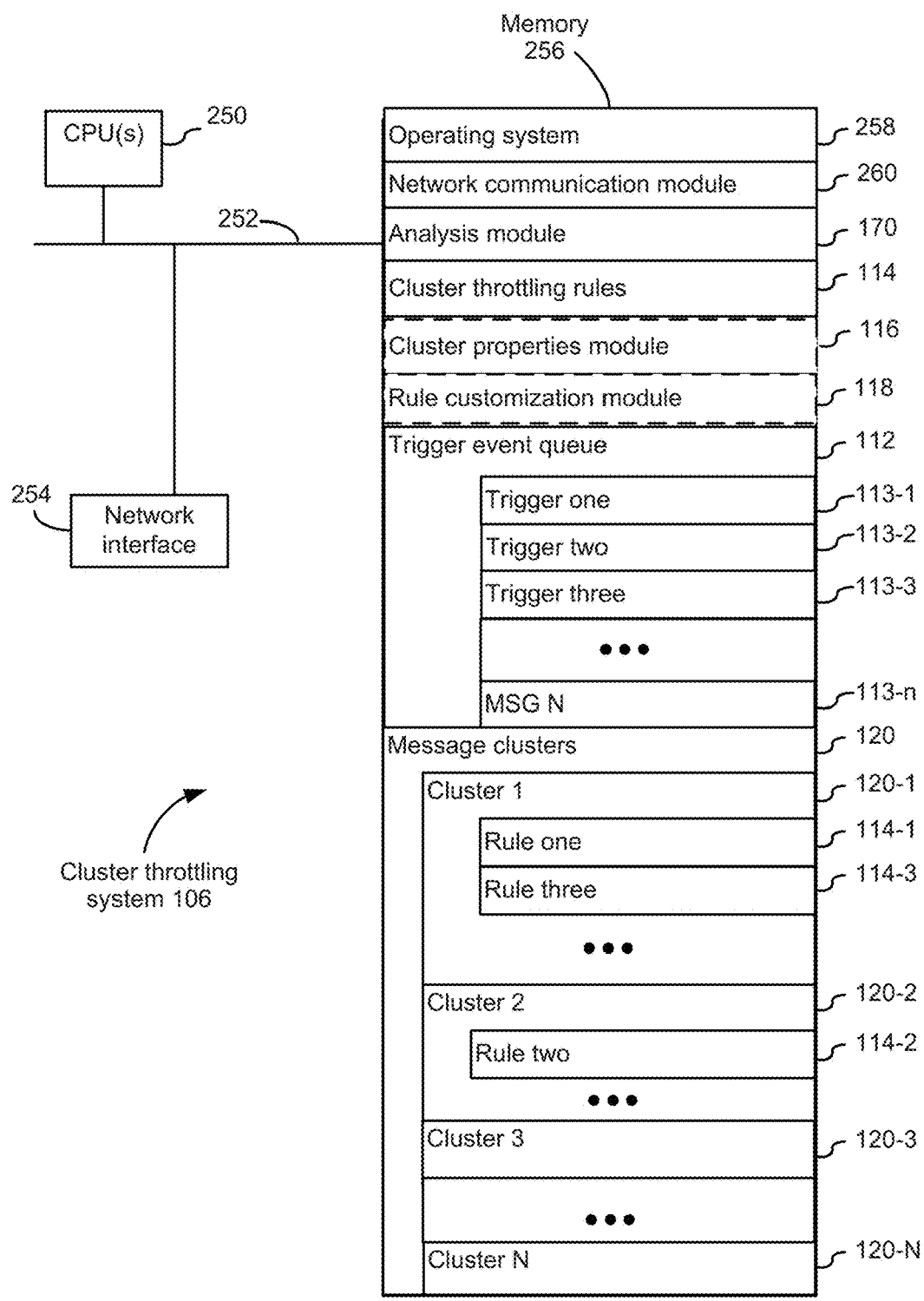

FIG. 2B is a block diagram illustrating a clustering throttling system 106, in accordance with some implementations. The clustering throttling system 106 typically includes one or more processing units CPU(s) 250 (also referred to as processors), one or more network interfaces 254, memory 256, and one or more communication buses 252 for interconnecting these components. The communication buses 252 optionally include circuitry (sometimes called a chipset) that interconnects and controls communications between system components. The memory 256 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 256 optionally includes one or more storage devices remotely located from CPU(s) 250. The memory 256, or alternatively the non-volatile memory device(s) within the memory 256, comprises a non-transitory computer readable storage medium. In some implementations, the memory 256 or alternatively the non-transitory computer readable storage medium stores the following programs, modules and data structures, or a subset thereof:

an operating system 258, which includes procedures for handling various basic system services and for performing hardware dependent tasks;

a network communication module (or instructions) 260 for connecting the clustering throttling system 106 with other devices (e.g., the devices 102) via the one or more network interfaces 254 (wired or wireless), or the communication network 104 (FIG. 1);

an analysis module 170 for conducting a content-based analysis on (e.g., incoming and outgoing) electronic messages and assigning electronic messages to one or more clusters in accordance with the content based analysis (e.g., content categories);

a trigger event queue 112 for storing trigger events awaiting processing by the analysis module 170 (e.g., Trigger One 113-1, Trigger Two 113-2);

a collection of cluster throttling rules 114, which specify the conditions or circumstances for allowing display of a message cluster to be refreshed within a listing of electronic messages;

optionally a cluster properties module 116 for updating and storing cluster properties for some or all of the message clusters optionally a rule customization module 118 for enabling a user to customize (e.g., add, remove, and modify) the collection of cluster throttling rules 114; and one or more message clusters 120 with corresponding cluster throttling rules assigned thereto, which include, for example:
cluster 1 120-1 including:
Rule one 114-1; and
Rule three 114-3;
cluster 2 120-2 including:
Rule two 114-2;
cluster 3 120-3; and
cluster N 120-N.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 256 optionally stores a subset of the modules and data structures identified above. Furthermore, the memory 256 may store additional modules and data structures not described above.

Although FIGS. 2A and 2B show a "device 102" and a "clustering throttling system 106," respectively, FIGS. 2A and 2B are intended more as functional description of the various features which may be present in computer systems than as a structural schematic of the implementations described herein. In practice, and as recognized by those of ordinary skill in the art, items shown separately could be combined and some items could be separated.

Figure 3A:
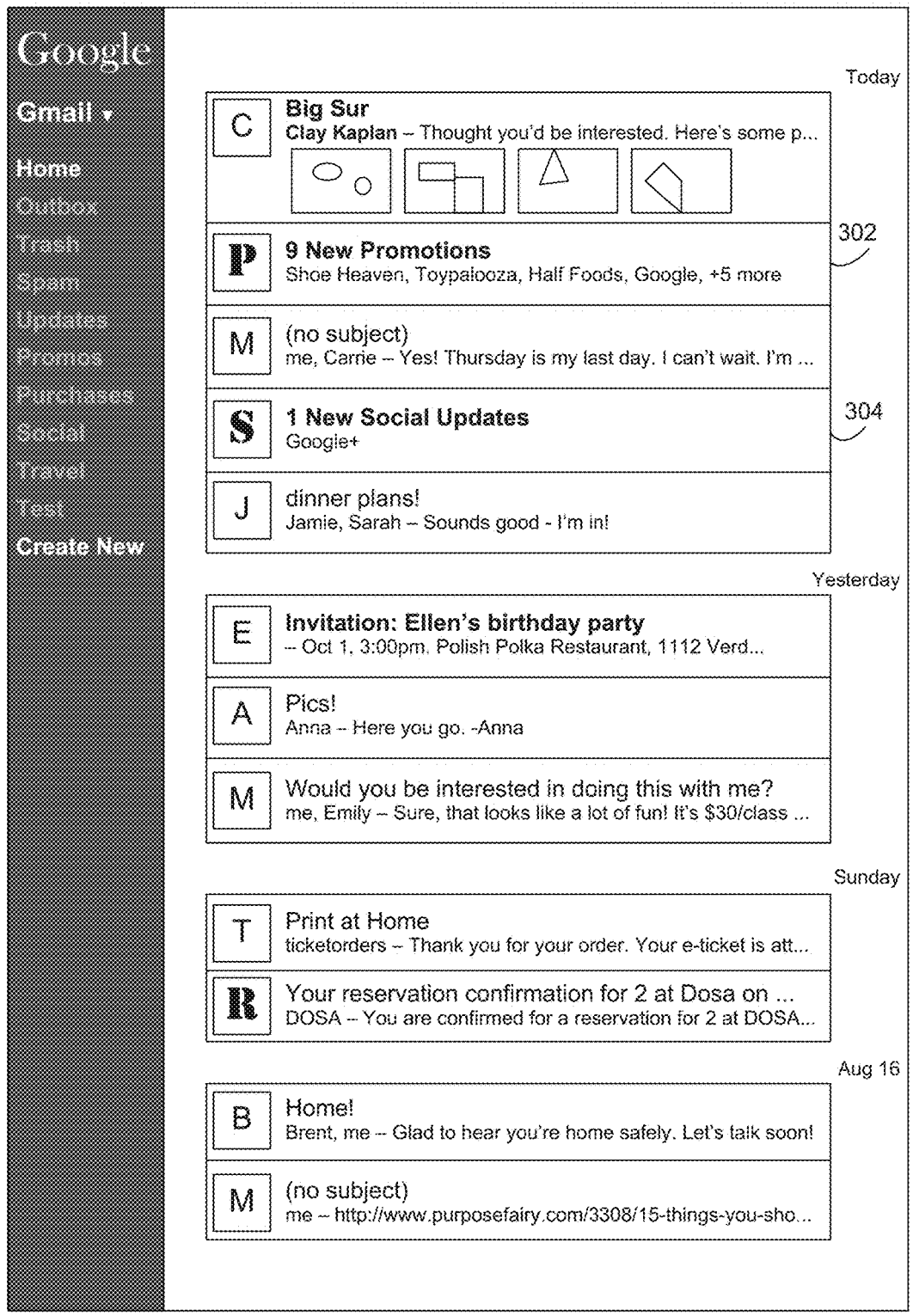

FIGS. 3A-3D illustrate examples of message clusters and cluster display throttling, in accordance with some implementations. In FIG. 3A, a user interface is shown for an email application, comprising a listing of electronic messages (e.g., in an email inbox). The listing of electronic messages is shown to comprise at least two message clusters, cluster 302 and cluster 304. Cluster 302 is a group of electronic messages having a collective association, namely promotional material (e.g., advertisements for retail sales, newsletters from stores). As can be seen in FIG. 3A, cluster 302 comprises 9 new electronic messages, and cluster 304 comprises 1 new electronic message. In some embodiments, a new electronic message refers to a message that has not been viewed, opened, acknowledged or read by the user of the email application. FIG. 3B illustrates exemplary contents of message cluster 302, particularly email messages corresponding to promotional materials for various stores. In some embodiments, the messages in the cluster 302 are considered to have been viewed or opened upon transitioning from the synopsis view of cluster 302 in FIG. 3A to the listing view of cluster 302 in FIG. 3B. In some embodiments, the electronic messages listed in cluster 302 in FIG. 3B must be individually opened, in order to change the number of "new" messages within cluster 302.

Figure 3C:
Figure 3D:
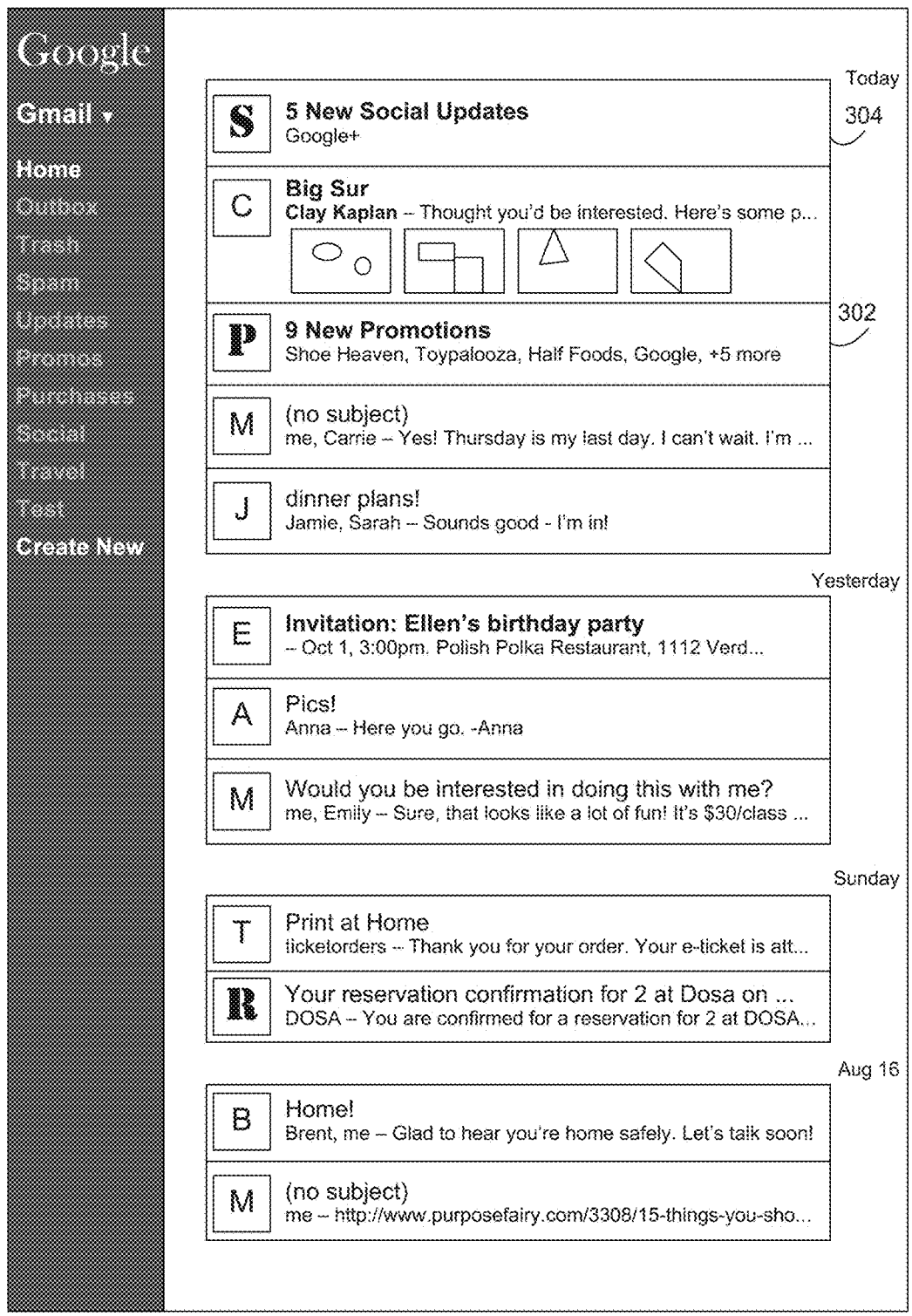

FIG. 3C illustrates cluster 304 being displayed after receiving two additional electronic messages. As can be seen in FIG. 3C, in some embodiments, the display of cluster 304 is not refreshed (e.g., promoted within the listing, reranked within the listing or placed at the top of the listing of electronic messages), upon receipt of an additional, or even two additional new electronic messages. This behavior reflects a setting for cluster 304 that "throttles" or adjusts the rate of display refresh for the cluster. In some embodiments, this setting takes the form of a rule. In some embodiments, message cluster rules are user-generated. For example, if the user of this particular email application has become weary of constant social network updates in his inbox, he has throttled social update cluster 304 to only update the display of cluster 304 after 5 new social update messages have been received, as shown in FIG. 3D. In some embodiments, display of cluster 304 has not been refreshed because a certain pre-defined passage of time since the previous display refresh, has not yet been detected.

FIG. 4 is an exemplary table 400 illustrating display throttling rules for electronic messages in a computing system, in accordance with some implementations. Table 400 comprises a Cluster column 402 referring to names or labels for specific clusters, and Cluster Type column 404 referring to a category for a particular cluster (e.g., Travel). In some embodiments, a Cluster Type can also have a sub-type, such as sales/promotions (Luxury) and sales/promotions (Essentials). Table 400 also comprises Trigger Events column 406, referring to particular trigger events that will invoke a display refresh of the corresponding message cluster. Table 400 also comprises a Rule number column 408 referring to an optional number assigned to a respective cluster throttling rule (e.g., a rule of the cluster throttling rules 114, FIG. 1). Rule column 410 describes the general requirements of a particular rule. In some embodiments, a respective cluster throttling rule is assigned only to one message cluster (e.g., rule 17 to the Gardening Tips cluster). In some embodiments, a cluster throttling rule is assigned to more than one message cluster (e.g., rule 1 to the Black Friday Sales cluster and the Airfare Deals cluster). Default column 412 refers to whether or not the respective cluster throttling rule is a default rule. In some embodiments, a cluster throttling rule is a default rule if it is set as the global default for all message clusters. In some embodiments, a cluster throttling rule is a default rule if it is set as a default rule for one or more message clusters. In some embodiments, a rule is a default rule if it is a default rule for all message clusters of a particular cluster type (e.g., Newsletters). In some embodiments, a cluster throttling rule is a default rule if it is either a global default rule or a default rule for one or more message clusters.

FIG. 4 also comprises several rows, 414-436. Row 414 and row 416 illustrate an exemplary message cluster "Black Friday Sales," of a sales/promotions (Luxury) type, having two cluster throttling rules assigned to it, rule 1 and rule 11. In this example, rule 1, "Refresh display after accumulation of 5 new messages," is set to respond to the trigger event of the "Black Friday Sales" message cluster receiving a new message. This rule is also set as the default rule. In some embodiments, the system creates or assigns a default rule to a new message cluster. In some embodiments, this is done on the basis of the message cluster type. The "Black Friday Sales" cluster is also shown to have a "time-based" cluster throttling rule assigned to it. Rule 11, refreshes display of the "Black Friday Sales" cluster at least once per hour until Mon. Dec. 2, 2013 at 11:59 PM. For example, the user may have created this short term throttling rule to see promotional messages of his interest during the month of November.

Table 400 also comprises row 418 and row 420, illustrating an exemplary message cluster "Google+ Updates," of a social network updates cluster type. This exemplary message cluster has two cluster throttling rules assigned to it, namely rule 4 and rule 15. In this example, rule 4 is set as the default rule, to refresh display of the message cluster after accumulation of 3 new messages, and responds to the trigger event of receiving a new social network post. In this example, rule 15 is a user-generated cluster throttling rule that refreshes display of the cluster immediately upon receipt of a message from Andy, a particular friend of the user of the email application. In some embodiments, rule 15 supersedes rule 4 with respect to display of the "Google+ Updates" message cluster, because it is a user-generated rule. In some embodiments, the most recently assigned rule to a message cluster has the highest priority for the respective message cluster (i.e., it supersedes all other rules assigned to the respective message cluster).

Table 400 also comprises row 422 and row 424, illustrating an exemplary message cluster "Airfare Deals," of a travel cluster type. This exemplary message cluster has two cluster display throttling rules assigned to it, namely rule 1 and rule 8. In this example, rule 1 is set as the default rule, and is also a rule applied to the "Black Friday Sales" cluster in row 414. This shows that in some embodiments, a respective cluster display throttling rule can be applied to more than one message cluster. Rule 8 illustrates a cluster display throttling rule associated with a keyword-based trigger event (e.g., refresh display immediately upon receipt of a message containing flights to Hawaii).

Row 426 of table 400 illustrates another time-based trigger event (e.g., detect time to be 6:00 PM on a Friday) and corresponding cluster display throttling rule, Rule 10. In some embodiments, a message cluster has only one associated cluster display throttling rule. In some embodiments, if the message cluster is a user-generated message cluster, it also requires a user-generated cluster display throttling rule. In some embodiments, a message cluster does not have a cluster display throttling rule, and display of that message cluster is not throttled or adjusted within a listing of electronic messages.

Row 428 and row 430 of table 400, illustrate an exemplary message cluster "Gardening Tips," of a newsletters cluster type. This exemplary message cluster has two cluster display throttling rules assigned to it, namely Rule 17 and Rule 18. Row 428 and row 430 illustrate that the same cluster throttling trigger event can correspond to more than one cluster display throttling rule, even for a single, respective message cluster. For example, in row 428 and row 430, the trigger event is receiving a new message corresponding to the "Gardening Tips" message cluster. Rule 17 and Rule 18 are "seasonal" time-based rules that are set to refresh display of the "Gardening Tips" message cluster much more frequently in the warmer months (e.g., March to September), than the colder months (e.g., October to February). In some embodiments, a pair or a set of cluster throttling rules work together in tandem, therefore there is no default cluster display throttling rule among them. For example, neither Rule 17 nor Rule 18 is set to be the default cluster display throttling rule for the "Gardening Tips" message cluster.

Row 432 and row 434 of table 400, illustrate an exemplary message cluster "Grocery and Pharmacy" of the sales/promotions cluster type and essentials cluster sub-type. This exemplary message cluster has two cluster display throttling rules assigned to it, namely Rule 2 and Rule 21. Row 432 and row 434 illustrate an example of a message cluster having two cluster display throttling rules that have some contradiction to each other. Rule 2 refreshes display immediately upon receipt of a new message by the "Grocery and Pharmacy" message cluster, but Rule 21 ceases to refresh display of the message cluster during the hours of 9:00 AM and 5:00 PM, Monday to Friday. This example illustrates that in some embodiments, a message cluster has conflicting or contradictory cluster display throttling rules. In some embodiments, the most recently applied cluster throttling rule takes precedence and supersedes the older rule or rules associated with the message cluster. In some embodiments, if a message cluster has a user-specified cluster display throttling rule associated with it, that user-specified (or user-generated) rule takes precedence. In some embodiments, when one rule takes precedence over other cluster display throttling rules, it only takes precedence during conditions where there is a conflict between the rules (e.g., the condition of detecting 9:00 AM to 5:00 PM, Monday to Friday with respect to Rule 2 and Rule 21). In some embodiments, when one rule takes precedence over other cluster display throttling rules, it renders the other conflicting rule or rules inactive.

Row 436 of table 400 illustrates a master default cluster display throttling rule that applies to all message clusters. In this example, Rule 3 applies to all message clusters, and ceases to refresh display of all message clusters while the email application's auto-away response has been activated by the user. In some embodiments, there can only be one master default cluster display throttling rule for all message clusters in the email application, or for all message clusters in a particular listing of electronic messages (e.g., all clusters in the inbox, or all clusters in a folder). In some embodiments, there can be more than one master default cluster display throttling rule within the email application, or for all message clusters in a particular listing of electronic messages.

Figure 5A:
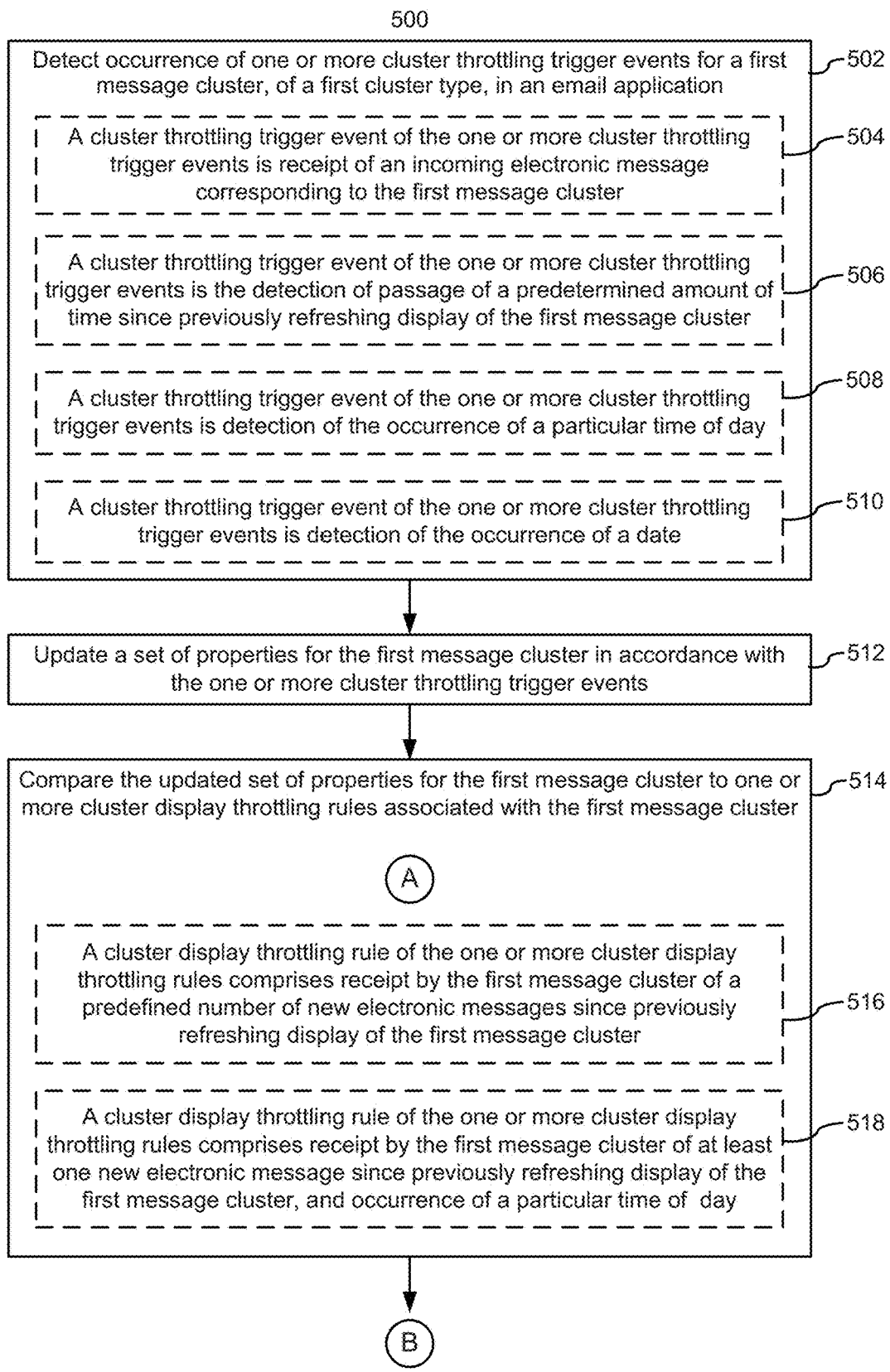
FIGS. 5A-5C are flow charts illustrating an example method for throttling display of electronic messages in a computing system, in accordance with some implementations.
Figure 5B:
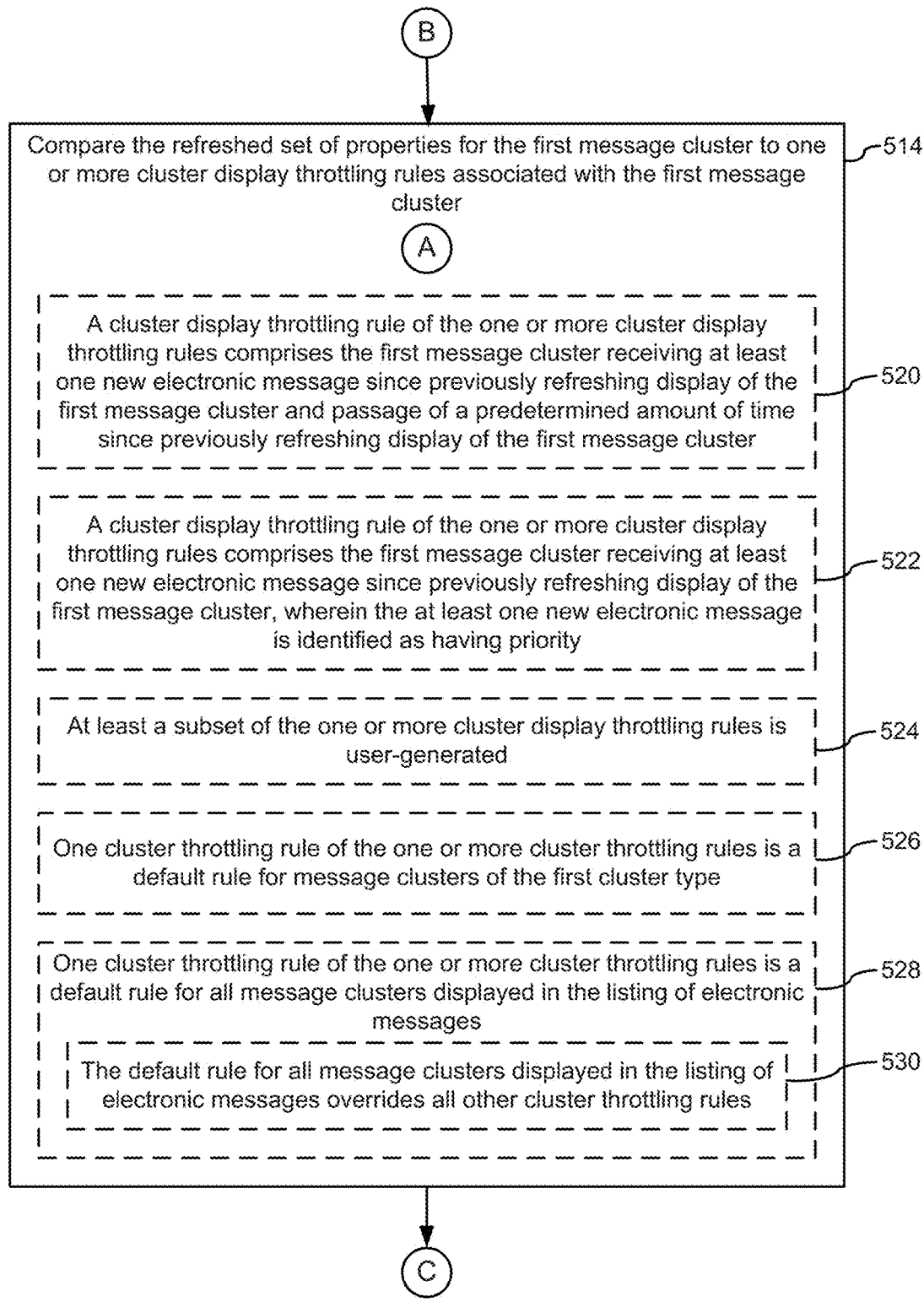
Figure 5C:
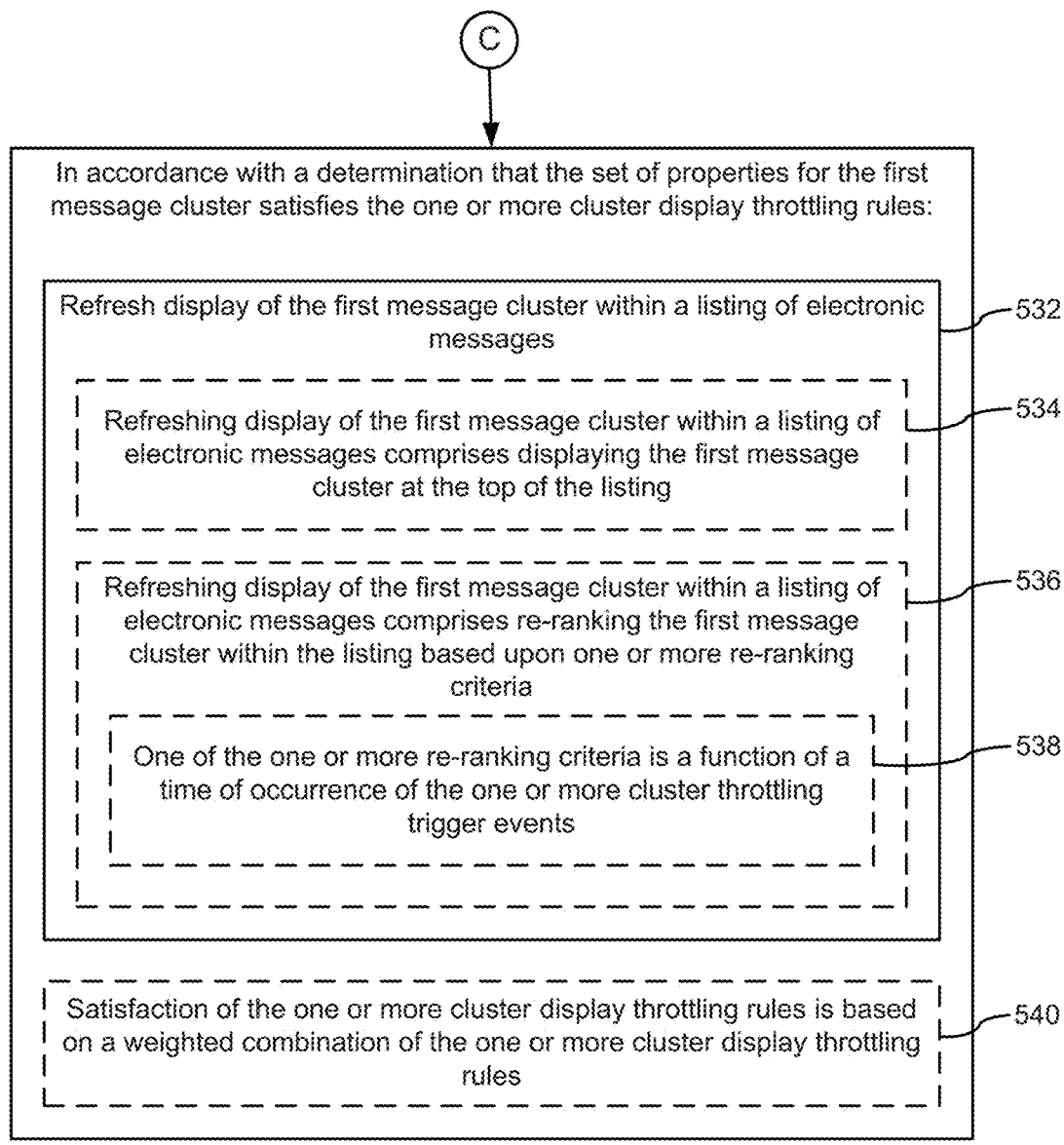

FIGS. 5A-5C illustrate a flow chart for method 500 of throttling clustered electronic messages. The method comprises detecting (502) occurrence of one or more cluster throttling trigger events for a first message cluster, of a first cluster type, in an email application. In some embodiments, a cluster throttling trigger event (504) of the one or more cluster throttling trigger events is receipt of an incoming electronic message corresponding to the first message cluster (e.g., receiving a new promotional email in the "Black Friday Deals" message cluster, row 414 in FIG. 4). In some embodiments, a cluster throttling trigger event (506) of the one or more cluster throttling trigger events is the detection of passage of a predetermined amount of time since previously refreshing display of the first message cluster (e.g., detecting 24 hours have passed since refreshing display of the respective message cluster). In some embodiments, this event is in combination with detecting receipt of at least one incoming electronic message corresponding to the first message cluster since previously refreshing display.

In some embodiments, a cluster throttling trigger event (508) of the one or more cluster throttling trigger events is detection of the occurrence of a particular time of day (e.g., 5:00 PM or Friday at 5:00 PM). In some embodiments, a cluster throttling trigger event (510) of the one or more cluster throttling trigger events is detection of the occurrence of a date (e.g., October 31).

The method further includes updating (512) a set of properties for the first message cluster in accordance with the one or more cluster throttling trigger events. For example, updating a set of properties for a respective message cluster with the number of new electronic messages since previously refreshing display of the respective message cluster. In another example, the set of properties for a respective message cluster is updated to include the passage of time since previously refreshing display of the respective message cluster.

The method further includes comparing (514) the refreshed set of properties for the first message cluster to one or more cluster display throttling rules associated with the first message cluster. In some embodiments, a cluster display throttling rule (516) of the one or more cluster display throttling rules comprises receipt by the first message cluster of a predefined number of new electronic messages since previously refreshing display of the first message cluster (e.g., Rule 1 in FIG. 4, refresh display after accumulation of 5 new messages). In some embodiments, a cluster display throttling rule (518) of the one or more cluster display throttling rules comprises receipt by the first message cluster of at least one new electronic message since previously refreshing display of the first message cluster, and occurrence of a particular time of day (e.g., Rule 10 in FIG. 4, refresh display every Friday at 6:00 PM if there are new messages in the cluster).

In some embodiments, a cluster display throttling rule (520) of the one or more cluster display throttling rules comprises the first message cluster receiving at least one new electronic message since previously refreshing display of the first message cluster and passage of a predetermined amount of time since previously refreshing display of the first message cluster. For example, the rule requires a respective message cluster to have received at least one new message within the last 24 hours, to allow refreshing display of the message cluster. In some embodiments, a cluster display throttling rule (522) of the one or more cluster display throttling rules comprises the first message cluster receiving at least one new electronic message since previously refreshing display of the first message cluster, where the at least one new electronic message is identified as having priority. For example, an electronic message is identified as having priority because it is a flagged or starred (e.g., user designated priority) message, or it is from a particular sender or it comprises one or more key words.

In some embodiments, at least a subset of the one or more cluster display throttling rules (524) is user-generated (e.g., Rule 15 for the Google+ Updates message cluster in FIG. 4). In some embodiments, one cluster throttling rule (526) of the one or more cluster throttling rules is a default rule for message clusters of the first cluster type. For example, for all messages clusters of the "Travel" type, the default rule is to refresh display only after accumulation of 5 new messages in the message cluster since previously refreshing the display. In some embodiments, one cluster throttling rule (528) of the one or more cluster throttling rules is a default rule for all message clusters displayed in the listing of electronic messages. For example, all message clusters displayed in an email application inbox are subject to a default rule of ceasing to refresh all message clusters while the email application user has enabled an out of office message. In some embodiments, the default rule for all message clusters (530) displayed in the listing of electronic messages overrides all other cluster throttling rules.

The method further includes, in accordance with a determination that the set of properties for the first message cluster satisfies the one or more cluster display throttling rules, refreshing (532) display of the first message cluster within a listing of electronic messages. For example, in accordance with a determination that the set of properties for a respective cluster indicate that at least one new electronic message has been received in the last 24 hours, the respective message cluster is displayed at the top of a list of email messages in an email inbox if it is assigned a cluster display throttling rule requiring receipt of at least one new electronic message within the last 24 hours.

In some embodiments, refreshing display (534) of the first message cluster within a listing of electronic messages comprises displaying the first message cluster at the top of the listing (e.g., cluster 304 in FIG. 3D). In some embodiments, refreshing display (536) of the first message cluster within a listing of electronic messages comprises re-ranking the first message cluster within the listing based upon a time of occurrence of a first trigger throttling event in the one or more cluster throttling trigger events. For example re-ranking the first message cluster results in the promotion of the first message cluster within the listing of electronic messages, but does not necessarily result in the first message cluster being displayed at the top of the listing.

In some embodiments, satisfaction of the one or more cluster display throttling rules (540) is based on a weighted combination of the one or more cluster display throttling rules. For example, display of the respective message cluster is refreshed based on how well it met a weighted combination of its assigned rule satisfaction (e.g., 50% of Rule 1 satisfaction and 50% of Rule 2 satisfaction). In this example, even if the respective message cluster only satisfies one of its two rules, its display is still refreshed within the listing of electronic messages if the threshold for satisfaction of the weighted combination is a score or value of 0.4 (e.g., since the message cluster attained a score or value of 0.5).

In some embodiments, refreshing display of the first message cluster within a listing of electronic messages is based on a rule-satisfaction score. For example, a respective message cluster receives a "score" based on a weighted combination of its two cluster display throttling rules, one that requires at least 3 newly received electronic messages since previously refreshing display of the message cluster and the other requiring receipt of one or more newly received electronic messages indicating a priority (e.g., starred messages). In this example, if the message cluster receives 7 new electronic messages since previously refreshing display of the message cluster and 3 of those electronic messages are marked as having a high priority, this particular message cluster receives a high "score" and is correspondingly promoted within the listing of electronic messages when display of the respective message cluster is refreshed.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation (s).

It will also be understood that, although the terms "first," "second," etc. may be used herein to describe various elements, these elements should not be limited by these terms. These terms are only used to distinguish one element from another. For example, a first message cluster could be termed a second message cluster, and, similarly, a second message cluster could be termed a first message cluster, without changing the meaning of the description, so long as all occurrences of the "first message cluster" are renamed consistently and all occurrences of the "second message cluster" are renamed consistently. The first message cluster and the second message cluster are both message clusters, but they are not the same message cluster.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of refreshing display of electronic messages, comprising:
at a computing device having one or more processors, a display, and memory storing one or more programs configured for execution by the one or more processors:
displaying a list of entries in an email application, wherein the list of entries comprises a first electronic message, a first cluster graphic, and a second cluster graphic, wherein:
the first cluster graphic represents a first message cluster having a first plurality of electronic messages distinct from the first electronic message;
the second cluster graphic represents a second message cluster having a second plurality of electronic messages distinct from the first electronic message and distinct from the first plurality of electronic messages; and
the first cluster graphic is distinct from the second cluster graphic;
detecting occurrence of a cluster display trigger event for the first message cluster, wherein the cluster display trigger event comprises one or more of:
detection of passage of a predetermined amount of time since refreshing display of the list of entries;
an occurrence of a particular time of day;
an occurrence of a predetermined date; and
receipt by the first message cluster of a predefined number, greater than one, of new electronic messages since previously refreshing display of the list of entries; and
in response to the detected cluster display trigger event and without user interaction:
re-ranking the list of entries; and
refreshing the display according to the re-ranking, thereby changing position of the first cluster graphic relative to the first electronic message and changing position of the first cluster graphic relative to the second cluster graphic.

2. The method of claim 1, wherein the cluster display trigger event comprises receipt by the first message cluster of at least one new electronic message since previously refreshing display of the list of entries and occurrence of a particular time of day.

3. The method of claim 1, wherein the cluster display trigger event comprises receipt by the first message cluster of at least one new electronic message since previously refreshing display of the list of entries and passage of a predetermined amount of time since previously refreshing display of the first message cluster.

4. The method of claim 1, wherein the cluster display trigger event comprises receipt by the first message cluster of the predefined number of new electronic messages since previously refreshing display of the list of entries, wherein at least one of the new electronic messages is identified as having high priority.

5. The method of claim 1, wherein the cluster display trigger event is detection of passage of a predetermined amount of time since refreshing display of the list of entries.

6. The method of claim 1, wherein the cluster display trigger event is occurrence of a particular time of day.

7. The method of claim 1, wherein the cluster display trigger event is occurrence of a predetermined date.

8. The method of claim 1, wherein the cluster display trigger event is receipt by the first message cluster of a predefined number, greater than one, of new electronic messages since previously refreshing display of the list of entries.

9. A computer system, comprising:
one or more processors;
a display;
memory; and
one or more programs, wherein the one or more programs are stored in the memory and configured for execution by the one or more processors, the one or more programs including instructions for:
displaying a list of entries in an email application, wherein the list of entries comprises a first electronic message, a first cluster graphic, and a second cluster graphic, wherein:
the first cluster graphic represents a first message cluster having a first plurality of electronic messages distinct from the first electronic message;
the second cluster graphic represents a second message cluster having a second plurality of electronic messages distinct from the first electronic message and distinct from the first plurality of electronic messages; and
the first cluster graphic is distinct from the second cluster graphic;
detecting occurrence of a cluster display trigger event for the first cluster, wherein the cluster display trigger event comprises one or more of:
detection of passage of a predetermined amount of time since refreshing display of the list of entries;
an occurrence of a particular time of day;
an occurrence of a predetermined date; and
receipt by the first message cluster of a predefined number, greater than one, of new electronic messages since previously refreshing display of the list of entries; and
in response to the detected cluster display trigger event and without user interaction:
re-ranking the list of entries; and
refreshing the display according to the re-ranking, thereby changing position of the first cluster graphic relative to the first electronic message and changing position of the first cluster graphic relative to the second cluster graphic.

10. The computer system of claim 9, wherein the cluster display trigger event comprises receipt by the first message cluster of at least one new electronic message since previously refreshing display of the list of entries and occurrence of a particular time of day.

11. The computer system of claim 9, wherein the cluster display trigger event comprises receipt by the first message cluster of at least one new electronic message since previously refreshing display of the list of entries and passage of a predetermined amount of time since previously refreshing display of the first cluster.

12. The computer system of claim 9, wherein the cluster display trigger event comprises receipt by the first message cluster of the predefined number of new electronic messages since previously refreshing display of the list of entries, wherein at least one of the new electronic messages is identified as having high priority.

13. The computer system of claim 9, wherein the cluster display trigger event is detection of passage of a predetermined amount of time since refreshing display of the list of entries.

14. The computer system of claim 9, wherein the cluster display trigger event is occurrence of a particular time of day.

15. A non-transitory computer readable storage medium storing one or more programs configured for execution by a computer system having one or more processors and memory, the one or more programs comprising instructions for:

displaying a list of entries in an email application, wherein the list of entries comprises a first electronic message, a first cluster graphic, and a second cluster graphic, wherein:

the first cluster graphic represents a first message cluster having a first plurality of electronic messages distinct from the first electronic message;

the second cluster graphic represents a second message cluster having a second plurality of electronic messages distinct from the first electronic message and distinct from the first plurality of electronic messages; and the first cluster graphic is distinct from the second cluster graphic;

detecting occurrence of a cluster display trigger event for the first message cluster, wherein the cluster display trigger event is one or more of:

detection of passage of a predetermined amount of time since refreshing display of the list of entries;

an occurrence of a particular time of day;

an occurrence of a predetermined date; and receipt by the first message cluster of a predefined number, greater than one, of new electronic messages since previously refreshing display of the list of entries; and in response to the detected cluster display trigger event and without user interaction:

re-ranking the list of entries; and refreshing the display of the list according to the re-ranking, thereby changing position of the first cluster graphic relative to the first electronic message and changing position of the first cluster graphic relative to the second cluster graphic.

16. The computer readable storage medium of claim 15, wherein the cluster display trigger event comprises receipt by the first message cluster of at least one new electronic message since previously refreshing display of the list of entries and occurrence of a particular time of day.

17. The computer readable storage medium of claim 15, wherein the cluster display trigger event comprises receipt by the first message cluster of at least one new electronic message since previously refreshing display of the list of entries and passage of a predetermined amount of time since previously refreshing display of the first message cluster.

18. The computer readable storage medium of claim 15, wherein the cluster display trigger event comprises receipt by the first message cluster of the predefined number of new electronic messages since previously refreshing display of the list of entries, wherein at least one of the new electronic messages is identified as having high priority.

19. The computer readable storage medium of claim 15, wherein the cluster display trigger event is occurrence of a predetermined date.

20. The computer readable storage medium of claim 15, wherein the cluster display trigger event is receipt by the first message cluster of a predefined number, greater than one, of new electronic messages since previously refreshing display of the list of entries.

* * * * *